Inventor
Martin L. Hunker

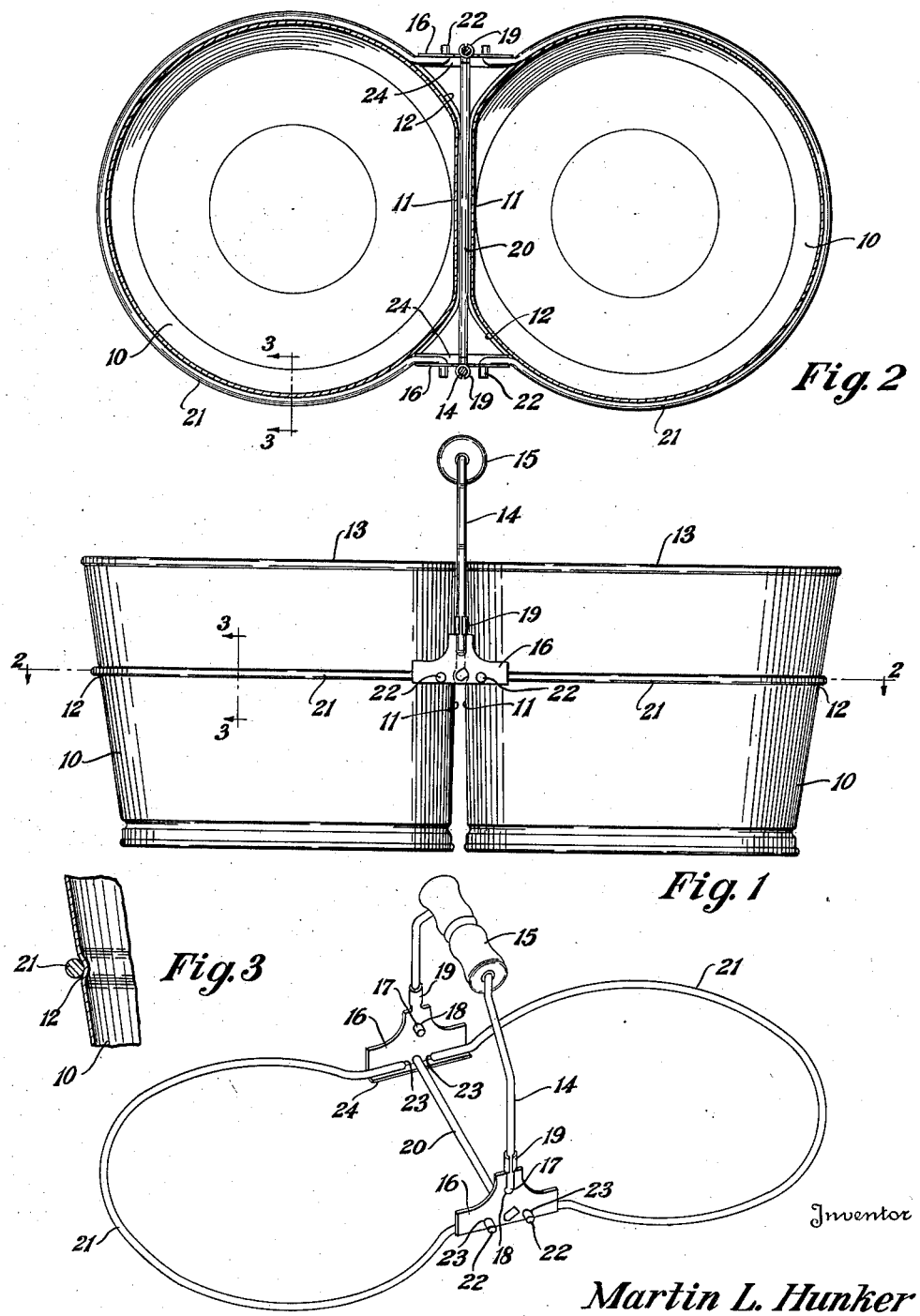

Patented Sept. 7, 1937

2,092,456

UNITED STATES PATENT OFFICE 2,092,456

HOLDER FOR TWIN PAILS

Martin L. Hunker, Dover, Ohio, assignor to The Reeves Manufacturing Company, Dover, Ohio, a corporation of Ohio Application March 26, 1936, Serial No. 71,067

4 Claims. (Cl. 224—45)

The invention relates to a holder for pails and more particularly to a holder adapted to clamp two pails together for cleaning, scrubbing, washing woodwork, walls and the like, so that one pail may contain water having soap or cleaning powder therein while the other pail contains clear water for rinsing.

The object of the improvement is to provide a holder which may be quickly and easily attached to or detached from two similar pails, the holder having a single handle by means of which the two pails may be lifted and carried as a unit.

Another object is to provide a holder of this character comprising a handle bail and a pair of oppositely disposed hoops or loop members connected to the handle bail and adapted to encircle a pair of similar pails.

A further object is to provide such a holder in which the hoops or loop members are hingedly connected to the handle bail so that the holder may be collapsed or folded for shipping or storage.

A still further object is to provide such a holder in which the hoops or loop members may be quickly and easily detached from the handle bail so that the holder may be knocked down for shipping or storage.

Another object of the improvement is to provide a slight peripheral groove around each of the pails to receive the hoops or loop members of the holder.

Figure 5:
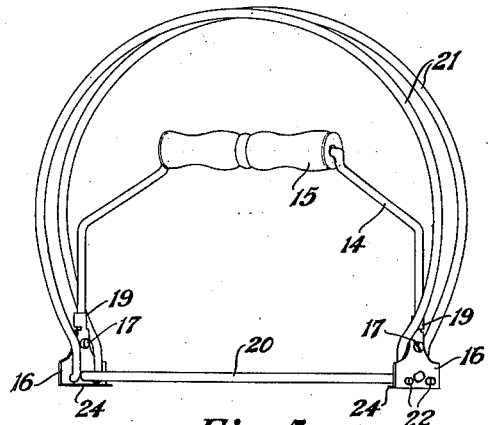
Figure 6:
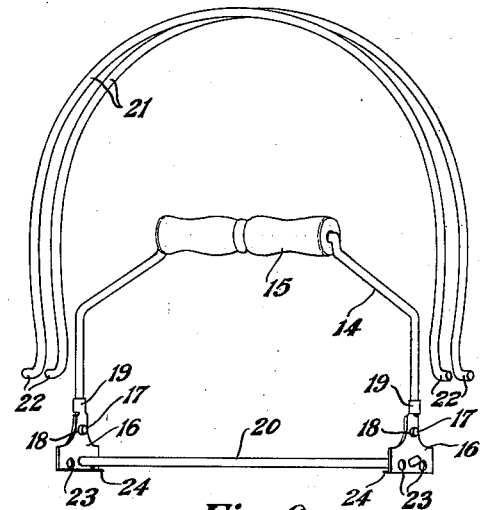
Figure 7:
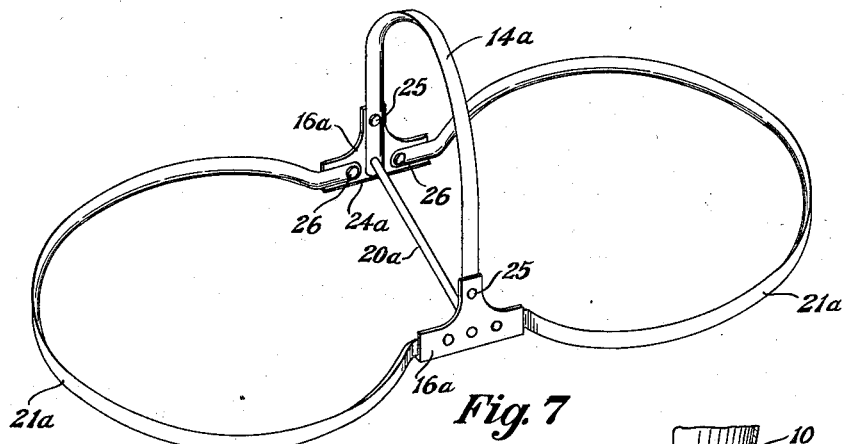
Figure 9:
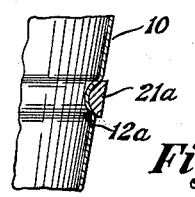
Figure 8:
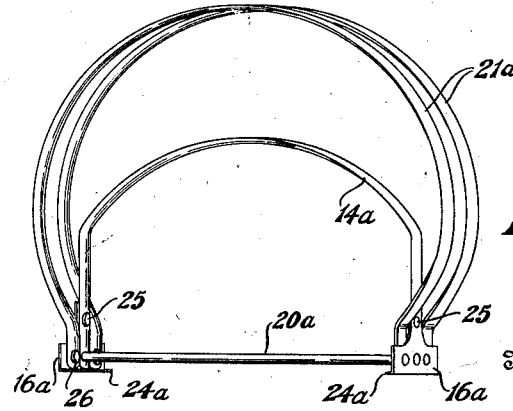

The above objects, together with others which will be apparent from the drawings and following description, or which may be later referred to, may be attained by constructing the improved holder in the manner illustrated in the acccompanying drawings, in which Figure 1 is a side elevation of a pair of pails connected together with the improved holder;

Fig. 2, a section taken substantially on the line 2—2, Fig. 1;

Fig. 3, an enlarged section taken as on the lines 3—3, Figs. 1 and 2;

Fig. 4, a detached perspective view of the improved holder, showing the same in open position;

Fig. 5, a perspective view of the improved holder, showing the same in collapsed or folded position;

Fig. 6, a similar view showing the holder in the knocked down or detached condition;

Fig. 7, a view similar to Fig. 4, showing a modified form of the holder in open position;

Fig. 8, a perspective view of the modified form of holder, showing the same in collapsed or folded position; and Fig. 9, a fragmentary section similar to Fig. 3, showing the modified form of holder.

Similar numerals refer to similar parts throughout the drawings.

The pails indicated generally at 10, adapted to be used with the improved holder, may be substantially of usual or ordinary construction and design, excepting that the usual handle bails may be omitted and each pail is preferably slightly flattened at one side, as indicated at 11, and preferably a slight peripheral groove 12 may be provided around the pail at a point spaced below the usual rim bead 13.

The holder may include the handle bail 14 which may be formed of heavy wire and provided with a hand grip 15 formed of wood or the like. This bail may be rigidly connected to the triangular or T-shaped sheet metal brackets 16 by means of the hooked ends 17 of the bail inserted through suitable openings 18 in the brackets, ears 19 upon said brackets being bent around the legs of the bail 14 to hold the same rigidly in position relative to the brackets 16.

A brace bar 20 of wire or the like may be connected at opposite ends to the brackets 16 to strengthen the structure of the frame and assist in holding the brackets in spaced relation to each other.

A spring wire hoop or loop member 21 is connected to each side of each of the brackets 16, preferably by means of the angular ends 22 of the hoops or loop members extending through apertures 23 in the brackets.

The hoops or loop members 21 are thus hingedly connected to the brackets and adapted to rest upon the angular flanges 24, formed at the lower edges of the brackets, when said hoops are in the open or operative position, as shown in Figs. 1, 2 and 4. One of the pails 10 may be inserted through each of the hoops or loop members 21, the flat sides 11 of the pails being located toward each other, as best shown in Fig. 2, the hoops 21 being seated in the shallow annular grooves 12 of the pails. The two pails are thus rigidly held together in the holder and may be picked up or carried as a unit by means of the handle bail 14. One pail may contain soapy water or the like for cleaning and the other pail may contain clear water for rinsing.

The holder is so constructed that it may be very readily attached to or detached from the pails so that the water may be easily poured from each pail.

The hoops 21 being hingedly connected to the brackets, the holder may be collapsed or folded as shown in Fig. 5, so as to occupy a very small space. Thus when the pails are not in use, the holder may be removed therefrom and folded as shown in Fig. 5 and the pails may be nested one within the other, the folded holder being placed inside of the inner pail so that the whole unit occupies little more than the room required for a single pail.

In shipping the pails and holders, a number of the pails may be nested together and placed in a single carton, the holders being knocked down, as shown in Fig. 6, by detaching the hoops 21 from the brackets 16 and these hoops may be placed around the pails, while the assembly of the handle bail brackets and rod 20 may be placed within the inner or uppermost pail. Preferably twelve pails are shipped in a carton, the pails being nested in two tiers of six each, with the holders located as above described.

In Figs. 7, 8 and 9 is shown a modified form of the holder in which the handle bail 14a and hoops or loop members 21a are made of substantially half-round bars. The handle bail is rigidly connected to the brackets 16a as by the rivets 25 and the spacing rod 20a. The hoops 21a are hingedly connected to the brackets as by the pivot pins 26 and when in open position, as shown in Fig. 7, are adapted to rest upon the angular flanges 24a at the lower edges of the brackets. When not in use, for the purpose of storage or shipping, the holder may be collapsed by folding the hoops 21a together as shown in Fig. 8. The pails may be substantially the same as shown at 10 in Figs. 1 and 2, being provided with peripheral grooves 12a to accommodate the hoops 21a, as shown in Fig. 9.

I claim:

1. A holder for a pair of similar pails, including a handle bail, a bracket rigidly connected to each end of the bail, a brace bar rigidly connected at opposite ends to the brackets, and a pair of oppositely disposed hoops hingedly connected to said brackets, the pails being adapted to be inserted into said hoops on opposite sides of said brace bar and held clamped together in the holder.

2. A holder for a pair of similar pails, including a handle bail, an inverted T-shaped bracket rigidly connected at its central portion to each end of the bail, a brace bar rigidly connected at opposite ends to the brackets, and a pair of oppositely disposed hoops hingedly connected to opposite legs of said brackets, the pails being adapted to be inserted into said hoops on opposite sides of said brace bar and held clamped together in the holder.

3. A holder for a pair of similar pails, including a handle bail, a bracket rigidly connected to each end of the bail, an angular stop flange upon each bracket, a brace bar rigidly connected at opposite ends to the brackets, and a pair of oppositely disposed hoops hingedly connected to said brackets and adapted to rest upon said stop flanges, the pails being adapted to be inserted into said hoops on opposite sides of said brace bar and held clamped together in the holder.

4. A holder for a pair of similar pails, including a handle bail, an inverted T-shaped bracket rigidly connected at its central portion to each end of the bail, an angular stop flange upon the lower edge of each bracket, a brace bar rigidly connected at opposite ends to the brackets, and a pair of oppositely disposed hoops hingedly connected to opposite legs of said brackets and adapted to rest upon said stop flanges, the pails being adapted to be inserted into said hoops on opposite sides of said brace bar and held clamped together in the holder.

MARTIN L. HUNKER.